United States Patent Office 3,272,838
Patented Sept. 13, 1966

3,272,838
SUBSTITUTED TETRAHYDROPYRIDINES
Marshall D. Draper, Woodland Hills, and Fred Keller, Northridge, Calif., assignors to Rexall Drug and Chemical Company, Los Angeles, Calif., a corporation of Delaware
No Drawing. Filed Oct. 30, 1964, Ser. No. 407,861
7 Claims. (Cl. 260—297)

This application is a continuation-in-part of our application entitled, "Substituted Tetrahydropyridines," Serial No. 371,805, filed June 1, 1964, now abandoned.

This invention relates to compositions of matter classified in the art of chemistry as substituted tetrahydropyridines.

The invention sought to be patented resides in the concept of a chemical compound having the structural formula

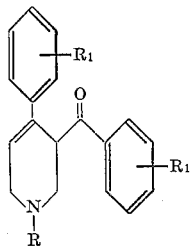

wherein R is a member selected from the group consisting of lower alkyl, lower alkenyl and phenyl-lower alkyl and $R_1$ is halo or lower alkoxy substituted at any position of the ring, and to its hereinafter described equivalents.

As used throughout the specification and in the claims the term "lower alkyl" embraces both straight and branched chain alkyl radicals having from 1 to 6 carbon atoms, for example methyl, ethyl, isopropyl, tert-butyl, n-hexyl, 2-ethylbutyl and the like; the term "lower alkenyl" denotes a monovalent radical $C_nH_{2n-1}$ wherein $n$ is an interger from 3 to 6, for example allyl, butenyl, hexanyl and the like; the term "phenyl-lower alkyl" denotes a radical wherein phenyl is substituted for a hydrogen atom of a lower alkyl substituent, for example benzyl, phenyethyl, α-methylbenzyl, phenyl-n-propyl and the like; the term "lower alkoxy" denotes alkoxy groups containing from 1 to 6 carbon atoms, for example methoxy, ethoxy, isopropoxy, n-butoxy, n-hexyloxy and the like; and the term "halo" embraces chloro, fluoro, bromo and iodo.

The tangible embodiments of this invention possess the inherent general physical properties of being solid crystalline materials. Infra-red and ultraviolet spectral data, and elemental analyses, taken together with the aforementioned physical properties, the nature of the starting materials and the mode of synthesis, positively confirm the structure of the compounds sought to be patented.

The tangible embodiments of this invention possess the inherent applied use characteristics of having significant pharmacological activity as antipyretic and anti-inflammatory agents as determined by recognized and accepted pharmacological test procedures as well as being valuable intermediates for preparing other pharmacologically active compounds. For example, treatment of the tangible embodiments of this invention with an alkali metal borohydride or an alkali metal aluminohydride results in the reduction of the carbonyl group of the benzoyl substituent at the 3-position to prepare the corresponding 3-(α-hydroxybenzyl) compounds which are described and claimed in the application of Marshall Draper entitled "Substituted Tetrahydropyridines and Process Therefor," Serial No. 407,846, filed Oct. 30, 1964.

The manner and process of making and using the invention will now be generally described so as to enable a person skilled in the art of chemistry to make and use the same as follows:

The compounds comprising the tangible embodiments of this invention are prepared from appropriately substituted diketone amines according to the following reaction:

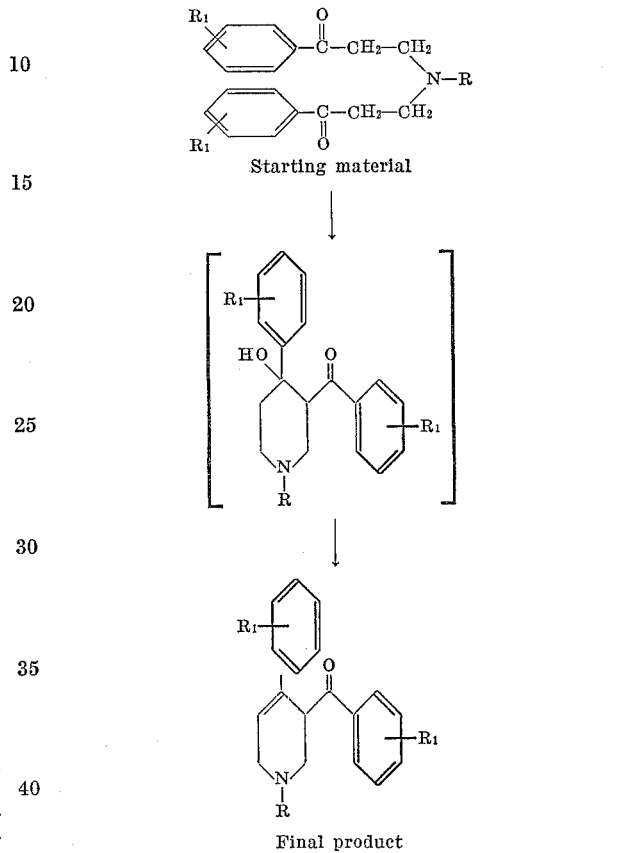

wherein R and $R_1$ are as described hereinabove.

The substituted diketone amine starting materials employed in the preparation of the tangible embodiments of this invention are known compounds that may easily be prepared according to the method described by Mannich and Heilner (Ber. 55: 356, 1922) as improved by Plati et al (J. Org. Chem. 14: 543–549, 1949).

In obtaining the compounds of the present invention, the appropriately substituted diketone amine starting material is subjected to treatment with base to form a substituted 4-hydroxy piperdine which may, if desired, be then converted directly to the final product by treatment, at an elevated temperature of about 70° C. to 100° C., with acetic anhydride in the presence of a small quantity of sulfuric acid as catalyst. The intermediate may also, if desired, be first isolated and then converted to the final product by treatment with a dehydrating agent such as, for example, trifluoroacetic acid anhydride. The final product is then recovered by conventional techniques of crystallization.

Starting materials having two or three $R_1$ substituents on the benzene rings are prepared by the methods described in the above-mentioned papers and are the full equivalents to the specific starting materials illustrated above in a reaction with base followed by treatment with acetic anhydride/sulfuric acid thereby to prepare final products having the same utility as the specific final products illustrated above which are included within the scope of the tangible embodiments of this invention.

The tangible embodiments of this invention can, if desired, be converted into their non-toxic pharmaceutically acceptable acid-addition and quaternary ammonium salts. Salts which may be formed comprise, for example, salts with inorganic acids, such as the hydrochloride, hydrobromide, hydroiodide, sulfate, phosphate or the like. They may also comprise salts with organic acids, including monobasic acids such as the acetate or the propionate, and especially those with hydroxy organic acids and dibasic acids, such as citrate, tartrate, malate, maleate and fumarate. Pharmaceutically, the salt will not be substantially more toxic than the compound itself and, to be acceptable, it should be able to be incorporated into conventional liquid or solid pharmaceutical media. Among the useful quaternary ammonium salts are those formed by such alkyl halides as methyl iodide, n-hexyl bromide and the like. Such pharmaceutically useful acid-addition and quaternary ammonium salts are the full equivalents of the bases from which they are derived and are included within the scope of this invention.

The tangible embodiments of this invention, either as free bases or in the form of a non-toxic pharmaceutically acceptable acid-addition or quaternary ammonium salt, can be combined with conventional pharmaceutical diluents and carriers, to form such dosage forms as tablets, suspensions, solutions, suppositories and the like.

The best mode contemplated by the inventors for carrying out their invention will now be set forth as follows:

The following examples illustrate the preparation of final products directly from the starting materials without isolation of the intermediate.

EXAMPLE 1

*1-methyl-3-(p-chlorobenzoyl)-4-(p-chlorophenyl)-1,2,3,6-tetrahydropyridine*

Bis-N-($\beta$-p-chlorobenzoylethyl)methyl amine hydrochloride (130 g., 0.325 mole) is dissolved in boiling water (1300 ml.) and is heated, with stirring, on a steam bath for 60 minutes. A 10% solution of sodium hydroxide (500 ml.) is then added with stirring. A solid forms during the addition which, after cooling of the mixture to room temperature, is recovered by filtration, washed twice with water and air dried.

A portion of the solid (18.2 g.) is suspended in anhydrous ether (100 ml.). To the suspension is then added concentrated sulfuric acid (1.5 ml.) in anhydrous ether (5 ml.). The mixture is taken to dryness and acetic anhydride (100 ml.) is added. The mixture is heated on the steam bath for two hours, then taken down in vacuo. Water (50 ml.) and an excess of ammonium hydroxide are added, the mixture extracted three times with ether. The ether extracts are washed with water, dried over anhydrous magnesium sulfate and filtered. The products is obtained by conversion to the hydrochloride and recrystallized from ethanol/ether. Yield is 6.2 g. (40%) of the hydrochloride salt, M.P. 187°–189° C.

*Analysis.* — Calculated for $C_{19}H_{20}Cl_3NO$ (382.71 M.W.): C, 59.63%; H, 4.74%; N, 3.66%; Cl, 27.80%. Found: C, 59.92%; H, 4.54%; N, 3.65%; Cl, 27.52%.

EXAMPLE 2

*1-methyl-3-(p-fluorobenzoyl)-4-(p-fluorophenyl)-1,2,3,6-tetrahydropyridine*

By the same process as described in Example 1, bis-N-($\beta$-p-fluorobenzoylethyl)methyl amine hydrochloride (110 g., 0.3 mole) is converted to 1-methyl-3-p-fluorobenzoyl-4-p-fluorophenyl-1,2,3,6-tetrahydropyridine which is recovered in the form of its free base. Yield 5.7 g. (12.5%), M.P. 127°–128° C.

*Analysis.*—Calculated for $C_{19}H_{17}F_2NO$: C, 73.0%; H, 5.48%; N, 4.48%. Found: C, 72.38%; H, 5.51%; N, 4.48%.

The following examples illustrate the preparation of final products after isolation of the intermediate.

EXAMPLE 3

*1-methyl-3-(p-methoxybenzoyl)-4-(p-methoxyphenyl)-1,2,3,6-tetrahydropyridine*

1-methyl-3-(p-methoxybenzoyl) - 4-hydroxy - 4-(p-methoxyphenyl)piperidine (45 g., 0.127 mole), prepared by the treatment of bis-N-($\beta$-p-methoxybenzoylethyl) methyl amine (118 g., 0.3 mole) with sodium hydroxide, is dissolved in chloroform (100 ml.) and a solution of concentrated sulfuric acid (7 ml.) in ether (25 ml.) is added with stirring. To the resulting solution is then added at room temperature trifluoroacetic acid anhydride (40 ml., 0.25 mole). The solution is heated to about 50° C. for 15 minutes after which the solution is allowed to cool. The product collects as an oil upon addition of ether and is recovered by decantation. The oil is washed with ether and then dissolved in water. The aqueous solution is washed once with ether and then basified with ammonium hydroxide. The product is extracted with chloroform and the extract washed with water, dried over anhydrous magnesium sulfate, filtered and concentrated. The product is then crystallized out of ether. Recrystallization yields 30 g., M.P. 94–97° C.

*Analysis.*—Calculated for $C_{21}H_{23}NO_3$: C, 74.85%; H, 6.88%; N, 4.16%. Found: C, 74.80%; H, 6.65%; N, 4.12%.

EXAMPLE 4

*1-allyl-3-(p-chlorobenzoyl)-4-(p-chlorophenyl)-1,2,3,6-tetrahydropyridine*

By the same procedure as described in Example 3, 1-allyl-3-(p-chlorobenzoyl)-4-hydroxy - 4-(p-chlorophenyl) piperidine hydrochloride (50 g.) prepared from bis-N-($\beta$-p-chlorobenzoylethyl)allylamine (70 g., 0.165 mole) by treatment with sodium hydroxide, is converted to 1-allyl-3-(p-chlorobenzoyl) - 4-(p-chlorophenyl) - 1,2,3,6-tetrahydropyridine (12.18 g.), M.P. 139.5–140.5%.

*Analysis.*—Calculated for $C_{21}H_{19}NOCl_2$: C, 67.90%; H, 5.15%; N, 3.77%; Cl, 19.05%. Found: C, 67.71%; H, 5.19%; N, 3.74%; Cl, 19.00%.

EXAMPLE 5

*1-allyl-3-(p-methoxybenzoyl)-4-(p-methoxyphenyl)-1,2,3,6-tetrahydropyridine*

By the same procedure as described in Example 3, 1-allyl - 3-(p-methoxybenzoyl) - 4-hydroxy - 4-(p-methoxyphenyl)piperidine (5 g.) is converted to 1-allyl-3-(p-methoxybenzoyl)-4-(p-methoxyphenyl) - 1,2,3,6-pyridine (2.8 g.).

*Analysis.*—Calculated for $C_{23}H_{25}NO_3$: C, 76.10%; H, 6.95%; N, 3.86%. Found: C, 76.50%; H, 6.91%; N, 3.82%.

EXAMPLE 6

*1-benzyl-3-(p-methoxybenzoyl)-4-(p-methoxyphenyl)-1,2,3,6-tetrahydropyridine*

By the same procedure as described in Example 3, 1-benzyl-3-(p-methoxybenzoyl)-4-hydroxy-4-(p-methoxyphenyl)piperidine (22.0 g., 0.051 mole) is converted to 1-benzyl - 3-(p-methoxybenzoyl) - 4-(p-methoxyphenyl)-1,2,3,6-tetrahydropyridine (18 g., 85% yield), M.P. 136–137.5°.

*Analysis.*—Calculated for $C_{27}H_{27}NO_3$: C, 78.70%; H, 6.6%; N, 3.39%. Found: C, 78.01%; H, 6.54%; N, 3.30%.

Using the procedures described in the foregoing examples there can also be prepared such other tangible embodiments of this invention as 1-methyl-3-(o-chlorobenzoyl)-4-(o-chlorophenyl)-1,2,3,6-tetrahydropyridine,
1-methyl-3-(m-chlorobenzoyl)-4-(m-chlorophenyl)-1,2,3,6-tetrahydropyridine,
1-methyl-3-(o-fluorobenzoyl)-4-(o-fluorophenyl)-1,2,3,6-tetrahydropyridine, 1-methyl-3-(m-fluorobenzoyl)-4-(m-fluorophenyl)-
1,2,3,6-tetrahydropyridine,
1-methyl-3-(o-methoxybenzoyl)-4-(o-methoxyphenyl)-
1,2,3,6-tetrahydropyridine,
1-methyl-3-(m-methoxybenzoyl)-4-(m-methoxyphenyl)-
1,2,3,6-tetrahydropyridine,
1-allyl-3-(o-chlorobenzoyl)-4-(o-chlorophenyl)-
1,2,3,6-tetrahydropyridine,
1-allyl-3-(m-chlorobenzoyl)-4-(m-chlorophenyl)
1,2,3,6-tetrahydropyridine,
1-allyl-3-(o-fluorobenzoyl)-3-(o-fluorophenyl)-
1,2,3,6-tetrahydropyridine,
1-allyl-3-(m-fluorobenzoyl)-4-(m-fluorophenyl)
1,2,3,6-tetrahydropyridine,
1-allyl-3-(p-fluorobenzoyl)-4-(p-fluorophenyl)-
1,2,3,6-tetrahydropyridine,
1-allyl-3-(o-methoxybenzoyl)-4-(o-methoxyphenyl)-
1,2,3,6-tetrahydropyridine,
1-allyl-3-(m-methoxybenzoyl)-4-(m-methoxyphenyl)-
1,2,3,6-tetrahydropyridine,
1-benzyl-3-(o-chlorobenzoyl)-4-(o-chlorophenyl)-
1,2,3,6-tetrahydropyridine,
1-benzyl-3-(m-chlorobenzoyl)-4-(m-chlorophenyl)-
1,2,3,6-tetrahydropyridine,
1-benzyl-3-(p-chlorobenzoyl)-4-(p-chlorophenyl)
1,2,3,6-tetrahydropyridine,
1-benzyl-3-(o-fluorobenzoyl)-4-(o-fluorophenyl)-
1,2,3,6-tetrahydropyridine,
1-benzyl-3-(m-fluorobenzoyl)-4-(m-fluorophenyl)
1,2,3,6-tetrahydropyridine,
1-benzyl-3-(p-fluorobenzoyl)-4-(p-fluorophenyl)-
1,2,3,6-tetrahydropyridine,
1-benzyl-3-(o-methoxybenzoyl)-4-(o-methoxyphenyl)
1,2,3,6-tetrahydropyridine,
1-benzyl-3-(m-methoxybenzoyl)-4-(m-methoxyphenyl)-
1,2,3,6-tetrahydropyridine and the like which are the full equivalents of the substituted tetrahydropyridines described in the specific examples hereinabove disclosed and are included within the scope of this invention.

The subject matter which the applicants regard as their invention is particularly pointed out and distinctly claimed as follows:

1. A compound of the formula

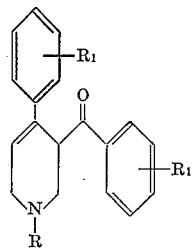

wherein R is a member selected from the group consisting of lower alkyl, lower alkenyl and phenyl-lower alkyl, and $R_1$ is a member selected from the group consisting of halo and low alkoxy.

2. 1-methyl-3-(p-chlorobenzoyl)-4-(p-chlorophenyl)-1,2,3,6-tetrahydropyridine.

3. 1-methyl-3-(p-fluorobenzoyl)-4-(p-fluorophenyl)-1,2,3,6-tetrahydropyridine.

4. 1-methyl - 3-(p-methoxybenzoyl) - 4-(p-methoxyphenyl)-1,2,3,6-tetrahydropyridine.

5. 1-allyl-3-(p-chlorobenzoyl)-4-(p-chlorophenyl)-1,2,3,6-tetrahydropyridine.

6. 1-allyl-3-(p-methoxybenzoyl)-4-(p-methoxyphenyl)-1,2,3,6-tetrahydropyridine.

7. 1-benzyl - 3-(p-methoxybenzoyl) - 4-(p-methoxyphenyl)-1,2,3,6-tetrahydropyridine.

No references cited.

WALTER A. MODANCE, *Primary Examiner.*

ROBERT T. BOND, *Assistant Examiner.*